B. A. BEMIS.
DISH WASHING MACHINE.
APPLICATION FILED MAR. 12, 1917.
1,280,640.
Patented Oct. 8, 1918.
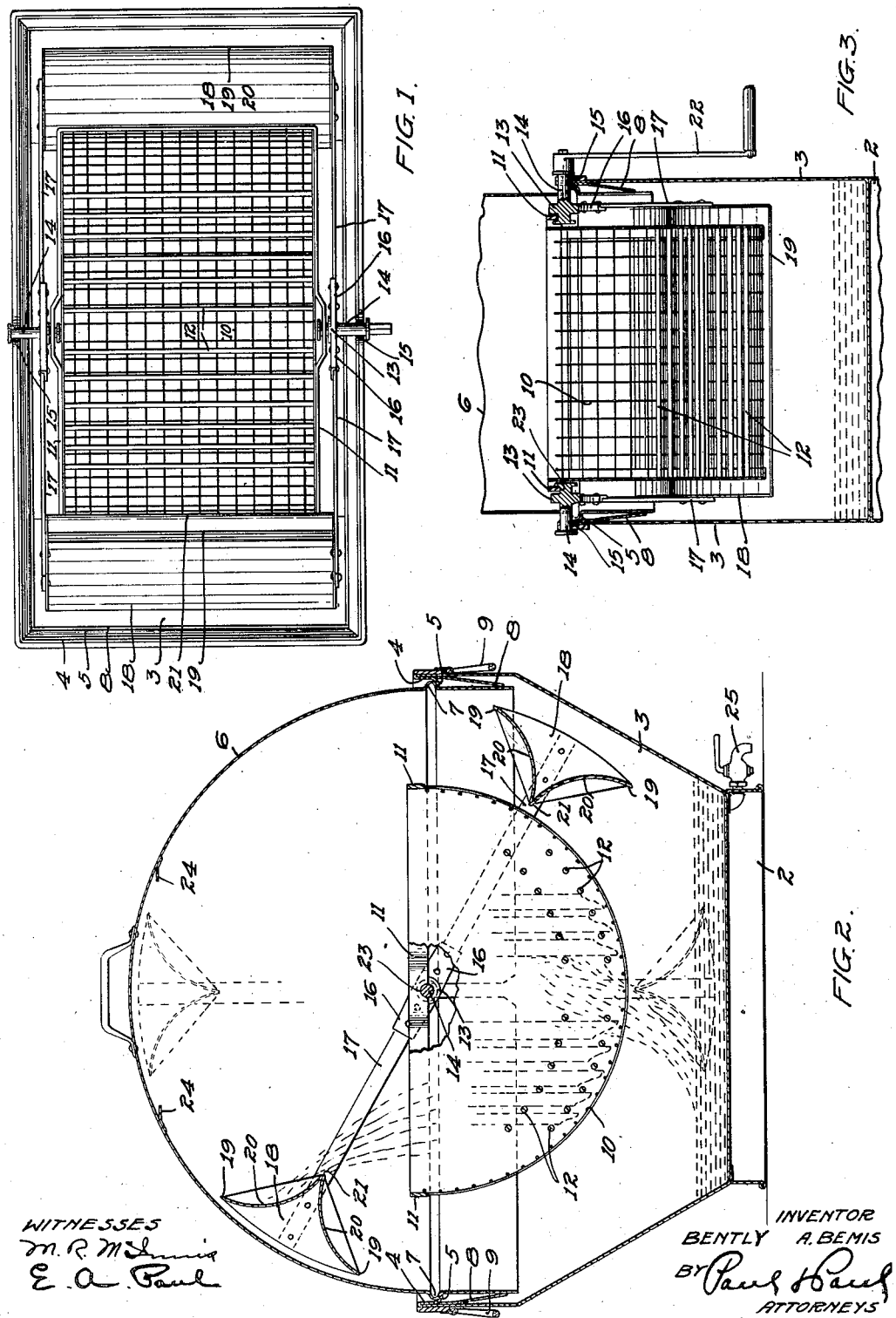

UNITED STATES PATENT OFFICE.

BENTLY A. BEMIS, OF MINNEAPOLIS, MINNESOTA.

DISH-WASHING MACHINE.

1,280,640.  Specification of Letters Patent.  Patented Oct. 8, 1918.

Application filed March 12, 1917. Serial No. 154,334.

*To all whom it may concern:*

Be it known that I, BENTLY A. BEMIS, a citizen of the United States, resident of Minneapolis, county of Hennepin, State of Minnesota, have invented certain new and useful Improvements in Dish-Washing Machines, of which the following is a specification.

The object of my invention is to provide a machine in which a quantity of dishes may be placed and subjected to streams of water from beneath, as well as above, to the end that the dishes will be thoroughly washed.

A further object is to provide a washing machine of compact construction in which a quantity of dishes may be placed and easily and quickly washed.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a washing machine embodying my invention,

Fig. 2 is a vertical sectional view of the same,

Fig. 3 is a similar view, taken on a section line at right angles substantially to the section line of Fig. 2.

In the drawing, 2 represents a suitable base on which the pan or receptacle containing a suitable supply of water is mounted. This receptacle has an inwardly turned flange 4 at the top, terminating in a lip 5 and a cover 6 has its lower edge fitting within the open top of the receptacle and provided with a rib or bead 7 which is seated on the lip 5 and supported thereby. A band 8 is inserted between the flange 4 and the wall of the receptacle and has its lower edge inwardly turned to bear with a yielding pressure against the wall of the cover and form a joint therewith which will prevent the splashing of water out of the receptacle during the dish washing operation. Suitable handles 9 are mounted on the top of the receptacle by means of which it may be lifted from place to place. A rack for the dishes is provided, having preferably a bottom 10 of wire mesh and a band 11 at the top. This dish rack is preferably semi-cylindrical in form and arranged therein between the end walls are a series of rods or wires 12, arranged in double rows, one above the other, spaced apart sufficiently to allow the dishes to be placed on edge between them, as indicated by the dotted lines in Fig. 2, the lower edges of the dishes being adjacent to the bottom of the rack. On each side of the rack are hubs 13 having studs 14 formed thereon, which are seated in depressions 15 provided in the upper edge of the receptacle 3.

These hubs are also provided with outwardly projecting lugs 16 to which arms 17 are secured, radiating from the studs 14 on each side of the dish carrier. There are two pairs of these arms, to the outer ends of which are secured flat, substantially triangular end plates 18, and between these end plates concave plates 20 are mounted, forming four water-gathering buckets arranged in pairs at the outer ends of the arms. The plates forming these buckets converge and their inner edges are adjacent the lower walls of the dish carrier and their outer edges are in position to enter the water in the receptacle, scoop it up into the buckets, from whence it will be directed by the concave surfaces of the buckets up through the lower walls of the dish carrier and the dishes therein. Sufficient space is provided between the bottom of the dish rack and the bottom of the receptacle to allow the buckets to sweep therethrough, motion being imparted to them by a suitable means, such as the hand crank 22 on one of the studs 14. The dish rack fits between these studs and the band 11 has recesses 23 to receive the hubs, the arms and buckets forming a connecting means between the hubs and allowing them to be revolved or rocked back and forth about the dish rack. The buckets or agitators are arranged at such an angle that they will gather up a quantity of the water and throw it upwardly through the meshes of the dish rack and upon the dishes therein, and a quantity of the water will be lifted sufficiently by the buckets to be discharged into the rack and upon the dishes, as indicated by dotted lines in Fig. 2. The buckets may be moved a partial revolution and then back again, the operating crank being rocked at the desired speed to throw or project a sufficient quantity of water through the dish rack from beneath, as well as above, or the buckets may be revolved completely around the dish rack and the water not only projected up through the bottom of the rack but dropped down upon the dishes from above.

In the top of the cover I prefer to provide deflector plates 24, which serve to check the water which may be following the wall of the cover and cause it to drop back into the rack beneath and through the dishes. For drawing off the water in the receptacle, I prefer to provide a faucet 25 in the bottom of the water tank.

This machine may be made in various sizes and in various ways the details of construction herein shown and described may be modified and still be within the scope of my invention.

I claim as my invention:

1. A dish washing machine comprising a receptacle adapted to contain a supply of water, and a cover therefor, a dish rack supported within said receptacle, an unobstructed space being provided between the end and side walls of said rack and said receptacle, arms mounted at each end of said rack to revolve in the space between said rack and the walls of said receptacle, the ends of said arms projecting beyond the walls of said rack, buckets secured to the projecting ends of said arms, and having concave walls diverging from their inner edges near said rack, said buckets having comparatively thin outer edges for entering the water in said receptacle and scooping it upon said concave surfaces as said arms are revolved, the angle of the bucket walls to the water causing a portion thereof to be directed upwardly through the bottom of said rack and a portion to be lifted and discharged from each bucket through the top of said rack.

2. A dish washing machine comprising a receptacle adapted to contain a supply of water, a cover therefor, a dish rack supported within said receptacle, an unobstructed space being provided between said rack and the walls of said receptacle, arms mounted to revolve at each end of said rack, buckets carried by the ends of said arms, the walls of said buckets diverging from a point near the bottom of said rack and having concave surfaces and terminating in comparatively thin edges for entering and scooping up the water from the bottom of said receptacle, said walls presenting an inclined surface as the buckets are moved through the water to direct it upwardly through the bottom of said rack, a portion of the water so gathered up being lifted and deposited through the top of said rack.

3. A dish washing machine comprising a receptacle adapted to contain a supply of water, a dish rack mounted within said receptacle, a bucket mounted to revolve around said rack and having an inner edge adjacent said rack and a concave wall extending outwardly therefrom, said wall deflecting the water gathered up by the outer edge thereof inwardly and upwardly through the bottom of said rack and the dishes therein.

4. A dish washing machine comprising a receptacle adapted to contain a supply of water, a dish rack mounted within said receptacle, buckets mounted to revolve around said rack and arranged in pairs placed back to back, the buckets of each pair having contacting inner edges near said rack and diverging outwardly therefrom, the outer edges of said buckets entering the water in said receptacle and the walls of said buckets deflecting it upwardly through the bottom of said rack and the dishes therein.

In witness whereof, I have hereunto set my hand this 7th day of March 1917.

BENTLY A. BEMIS.